United States Patent
Beigi et al.

(10) Patent No.: US 7,958,195 B2
(45) Date of Patent: Jun. 7, 2011

(54) METHOD AND APPARATUS FOR IMPROVING DATA TRANSFERS IN PEER-TO-PEER NETWORKS

(75) Inventors: Mandis S. Beigi, Tarrytown, NY (US); Raymond B. Jennings, III, Ossining, NY (US); Jason D. Lavoie, Mahopac, NY (US)

(73) Assignee: International Business Machines Corporation, Armonk, NY (US)

( * ) Notice: Subject to any disclaimer, the term of this patent is extended or adjusted under 35 U.S.C. 154(b) by 393 days.

(21) Appl. No.: 12/163,490

(22) Filed: Jun. 27, 2008

(65) Prior Publication Data

US 2008/0263166 A1 Oct. 23, 2008

Related U.S. Application Data

(63) Continuation of application No. 11/140,122, filed on May 27, 2005, now abandoned.

(51) Int. Cl.
*G06F 15/16* (2006.01)
*G06F 15/173* (2006.01)
*G06F 15/177* (2006.01)

(52) U.S. Cl. ......... 709/206; 709/243; 370/337; 370/389

(58) Field of Classification Search .......... 709/217–228, 709/200–203, 206, 243; 370/337, 389
See application file for complete search history.

(56) References Cited

U.S. PATENT DOCUMENTS

| | | | |
|---|---|---|---|
| 4,807,224 A | 2/1989 | Naron et al. | |
| 2003/0050966 A1* | 3/2003 | Dutta et al. | 709/203 |
| 2003/0191800 A1* | 10/2003 | Challenger et al. | 709/203 |
| 2004/0054807 A1* | 3/2004 | Harvey et al. | 709/243 |
| 2005/0021617 A1 | 1/2005 | Rusitschka | |
| 2005/0174972 A1* | 8/2005 | Boynton | 370/337 |
| 2006/0039371 A1* | 2/2006 | Castro et al. | 370/389 |

OTHER PUBLICATIONS

PCT Search Report and Written Opinion for PCT/EP2006/061881, pp. 1-10.

Hefeeda, M.M., et al., "A Hybrid Architecture for Cost-Effective On-Demand Media Streaming," Computer Networks, Elsevier Science Publishers B.V., Amsterdam, NL, vol. 44, No. 3, Feb. 20, 2004, pp. 353-382.

Yang, B., et al. Institute of Electrical Engineers, "Designing a Super-Peer Network," Proceedings 19th International Conference on Data Engineering, Bangalore, India, Mar. 5-8, International Conference on Data Engineering, vol. CONF. 19, Mar. 5, 2003.

* cited by examiner

*Primary Examiner* — Haresh N Patel

(57) ABSTRACT

One embodiment of the present method and apparatus for improving data transfers in peer-to-peer networks includes receiving a search request message from a requesting node, where the search request message requests specific data. A responding node then sends a response message to the requesting node including a referral message comprising at least one referred node that is expected to have the requested data, based on knowledge of the referred node's previous incoming and outgoing data transfers. The responding node may also indicate that the responding node has the requested data. In addition to increasing the requesting node's view of the peer-to-peer network, this also enables the identification of nodes (e.g., referred nodes) with which the requesting node may wish to establish direct peer-to-peer connections, e.g., to build peer-to-peer communities of nodes having similar interests.

26 Claims, 4 Drawing Sheets

METHOD AND APPARATUS FOR IMPROVING DATA TRANSFERS IN PEER-TO-PEER NETWORKS

CROSS REFERENCE TO RELATED APPLICATIONS

This application is a continuation of U.S. patent application Ser. No. 11/140,122, now abandoned, filed May 27, 2005, entitled "METHOD AND APPARATUS FOR IMPROVING DATA TRANSFERS IN PEER-TO-PEER NETWORKS", which is herein incorporated by reference in its entirety.

BACKGROUND

The present invention relates generally to computing networks and relates more particularly to the expansion of peer-to-peer data transfer networks.

FIG. 1 is a schematic diagram of a network 100 of nodes (e.g., computing devices) interacting in a peer-to-peer (P2P) manner. Generally, a requesting node 101 sends a search message 105 (e.g., containing keywords relating to data that the requesting node 101 wishes to locate) to at least one intermediate node 111 in communication with the requesting node 101 via a peer connection. The intermediate node 111 receives the search message 105 and forwards the search message 105 to at least one additional node 111. Eventually, the search message 105 reaches at least one responding node 103 having the requested data (in some cases, the first intermediate node 111 to which the search message 105 is forwarded will also be a responding node 103). At least one responding node 103 then sends a response message 107 back to the requesting node 101, e.g., via the intermediate nodes 111. The requesting node 101 then requests the relevant data from a responding node 103 by connecting directly to the responding node 103, e.g., via direct connection 109.

In conventional P2P systems, messages including the search message 105 have a limited time to live or hop count. That is, a message will expire once it has been forwarded to a predefined maximum number of nodes 101, 103 or 111. Thus, if the requesting node 101 generates a search message having a time to live of four, and a node at which the requested data resides (e.g., node 113) is more than four "hops" away from the requesting node 101, the search message will expire before the requested data is obtained. Typical methods for increasing the possibility of the search message reaching a node having the requested data thus include increasing the search message's time to live or increasing the number of peer connections per node; however, either method will cause an increase in network traffic.

Similar methods that may decrease download time include allowing selective downloads (by which a requesting node downloads the same data from multiple responding nodes at different offsets, thereby shortening download time), or to allow a requesting node to partner with one or more other peer nodes currently downloading the requested data. However, these methods do not increase the "view" of a node in the P2P network (e.g., by enabling search requests from the node to reach nodes further into the P2P network), nor do these methods enable the building of P2P communities of users having similar interests, which can increase the likelihood of searches finding desired content in the P2P network.

Thus, there is a need in the art for a method and apparatus for improving data transfers in P2P networks.

SUMMARY OF THE INVENTION

One embodiment of the present method and apparatus for improving data transfers in peer-to-peer networks includes receiving a search request message from a requesting node, where the search request message requests specific data. A responding node then sends a response message to the requesting node including a referral message comprising at least one referred node that is expected to have the requested data, based on knowledge of the referred node's previous incoming and outgoing data transfers. The responding node may also indicate that the responding node has the requested data. In addition to increasing the requesting node's view of the peer-to-peer network, this also enables the identification of nodes (e.g., referred nodes) with which the requesting node may wish to establish direct peer-to-peer connections, e.g., to build peer-to-peer communities of nodes having similar interests.

BRIEF DESCRIPTION OF THE DRAWINGS

So that the manner in which the above recited embodiments of the invention are attained and can be understood in detail, a more particular description of the invention, briefly summarized above, may be obtained by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures.

DETAILED DESCRIPTION

In one embodiment, the present invention is a method and apparatus for improving data transfers in P2P networks. Embodiments of the present invention make it possible for a requesting node on a P2P network to receive data from nodes that would normally be outside of the requesting node's "range" by enabling the referral, by intermediate nodes, of the out-of-range nodes. This capability further facilitates the building of "communities" within the P2P network, where a "community" in the context of the present invention is a subset of nodes in a P2P network that share common interests and/or data, e.g., over direct peer connections.

For the purposes of the present invention, the term "node" refers to a computing device such as a personal computing device (e.g., a desk top computer, a laptop computer, a cellular telephone, a personal digital assistant, etc.), a server, a router or the like that is connected to a P2P network.

Figure 1:
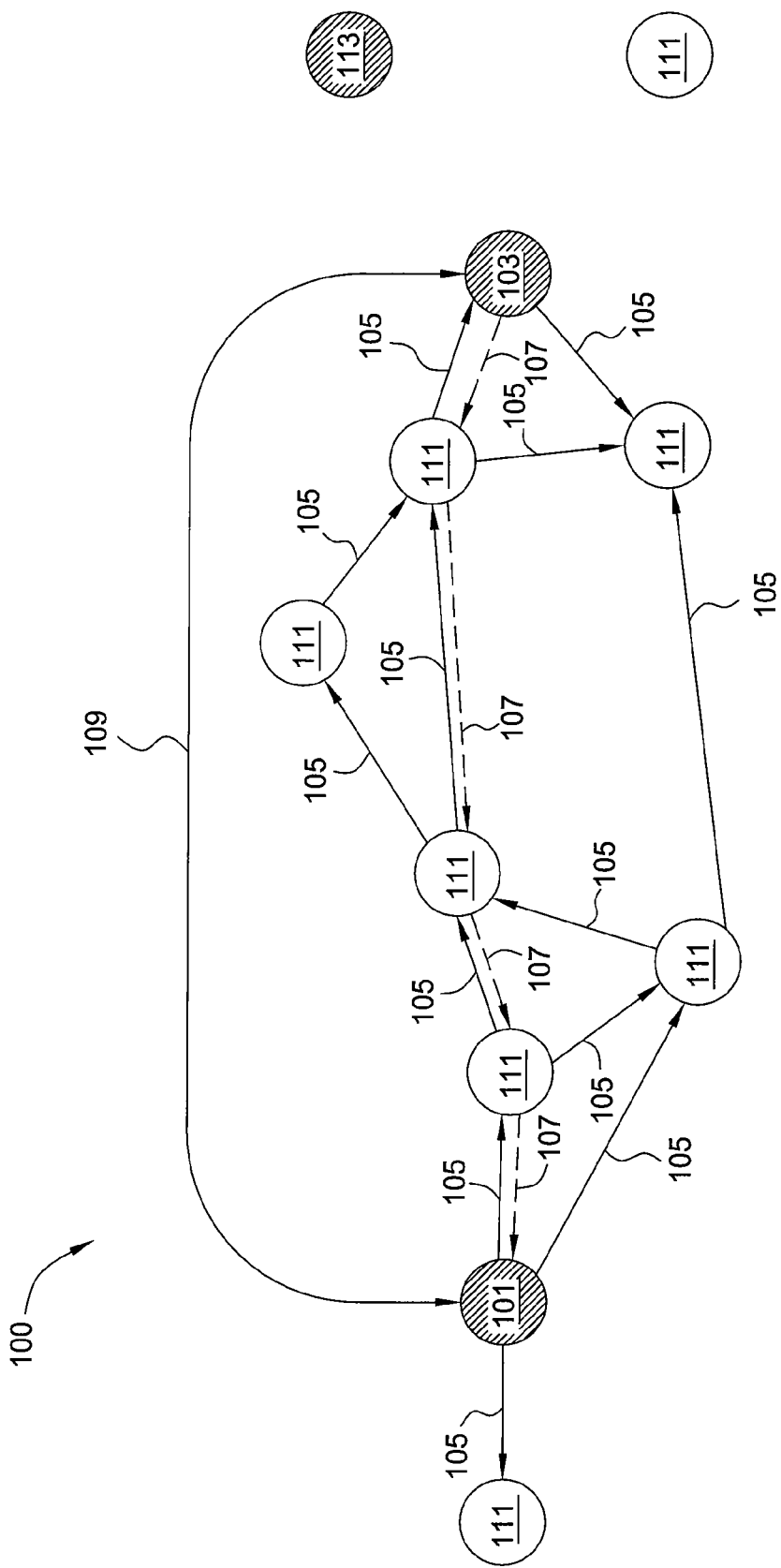
FIG. 1 is a schematic diagram of a network of nodes interacting in a peer-to-peer manner.
Figure 2:
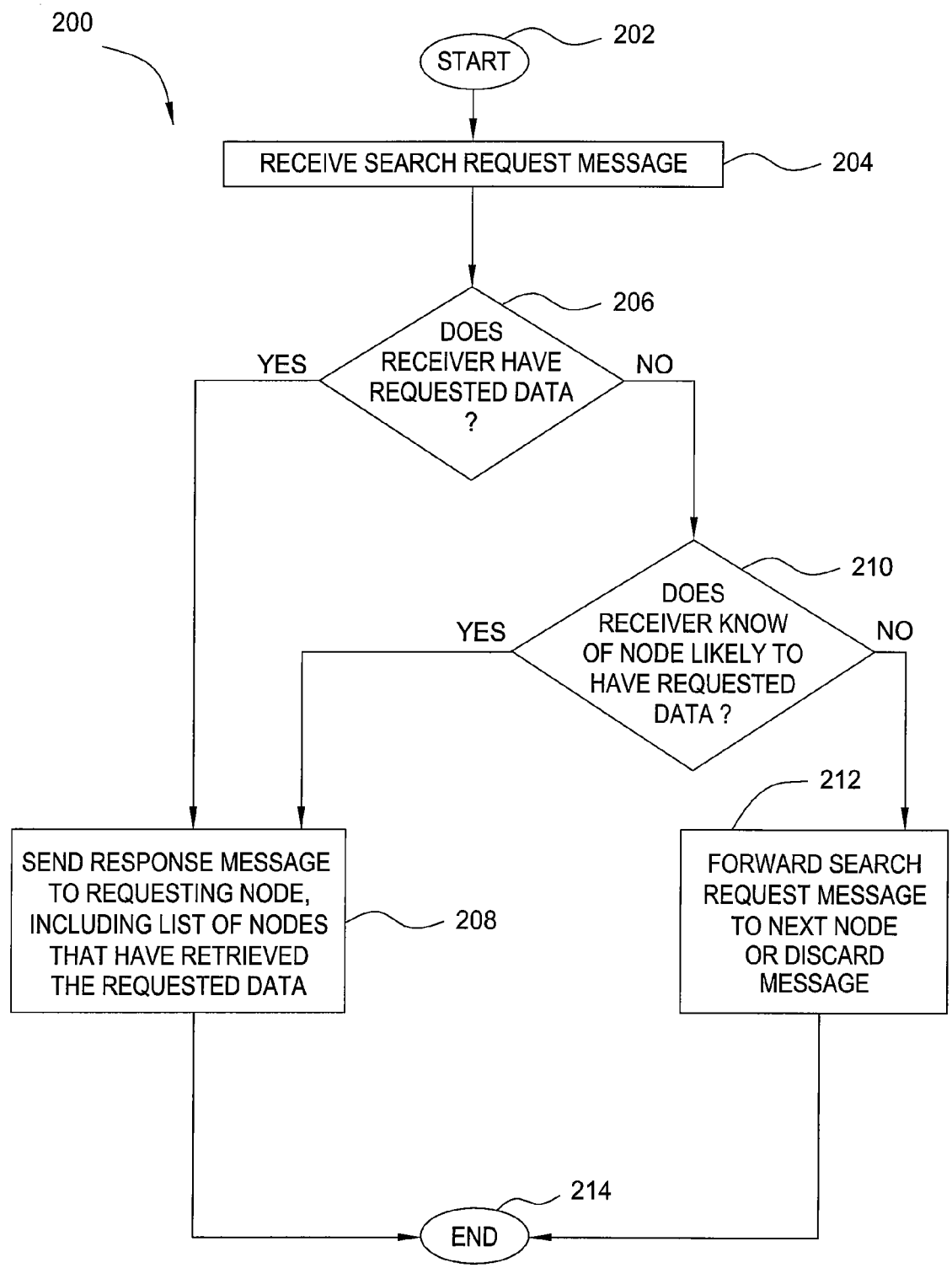
FIG. 2 is a flow diagram illustrating one embodiment of a method for referring out-of-range nodes in a P2P network, such as the network illustrated in FIG. 1.

FIG. 2 is a flow diagram illustrating one embodiment of a method 200 for referring out-of-range nodes in a P2P network, such as the network 100 illustrated in FIG. 1. The method 200 may be implemented at, for example, any node (e.g., 101, 103, 111 or 113) on the P2P network 100. The method 200 is initialized at step 202 and proceeds to step 204, where the method 200 receives a search request message, e.g., from a peer (connected) node.

The method 200 then proceeds to step 206, where the method 200 examines the search request message and determines whether the receiver (e.g., the node at which the search request message was received in step 204) has the requested data. If the receiver has the requested data, the method 200 proceeds to step 208 and sends a response message over the network 100 back to the requesting node, e.g., in accordance with conventional P2P protocols. The response message indicates that the receiver has the requested data.

In one embodiment, the response message sent in step 208 further includes a referral message comprising at least one referred node, where a "referred node" is another node in the P2P network that has previously retrieved the requested data. In one embodiment, the referral message is included in the response message. In another embodiment, the referral message is a separate message sent to the requesting node. In yet another embodiment, the referral message is piggybacked on the response message. In one embodiment, the referred nodes are nodes that have retrieved the requested data directly from the receiver. The referral message may include, for example, at least one of the hostnames, IP addresses, virtual names and other identifiers of the referred nodes.

In one embodiment, the referral message may be time-sensitive such that it includes only nodes that have retrieved the requested content within a predefined maximum timeframe (e.g., within the last 24 hours, etc.). This predefined maximum timeframe may be specified in the search request message (e.g., "refer only nodes that have requested the data within the past 24 hours"), or the predefined maximum timeframe may be specified at the receiver. The assumption is that if a referred node has recently (e.g., within the predefined maximum timeframe) retrieved the requested data, the referred node will likely still have the requested data available to share.

In yet another embodiment, the referral message may be sorted or ranked based on at least one of: uptime for the referred nodes, bandwidth of the referred nodes and latency of the referred nodes.

In one embodiment, the method 200 sends a referral message based on a threshold distance that the search request message has traveled in the network. For example, in one embodiment, the method 200 only sends a referral message if the search request message's time to live has expired (e.g., the receiver is an edge node in the requesting node's view of the P2P network). In another embodiment, the method 200 only sends a referral message if the search request message's time to live is at least half expired. This threshold distance may be specified by the requesting node, the receiver, or both.

Alternatively, if the method 200 determines in step 206 that the receiver does not have the requested data, the method 200 proceeds to step 210 and inquires whether the receiver knows of another node that is likely to have the requested data (e.g., because the node has previously downloaded the requested data from another source as discussed above). If the receiver does know of another node that is likely to have the requested data, the method 200 proceeds to step 208 as described above but sends only a referral message, and not a response message. Thus, even if the receiver does not have the requested data, the receiver may still be able to refer the requesting node to one or more other nodes that are likely to have the requested data.

However, if the receiver does not have the requested data and does not know of another node that is likely to have the requested data, the method 200 proceeds to step 212 and either forwards the search request message to the next node (e.g., in accordance with conventional P2P protocols) or discards the search request message (e.g., if the search message's time to live or hop count has expired).

The method 200 terminates in step 214. Based on the requesting node's evaluation of the response message, including the referral message, the receiver may be contacted by the requesting node for at least a portion of the requested data (if the method 200 has indicated that the receiver has the data).

The method 200 as described above enables the view of a node in a P2P network to be expanded while only minimally increasing network traffic. By enabling one or more nodes in a P2P network to "refer" out-of-range nodes to a requesting node, the view of the requesting node can be expanded despite the requesting node's inherently limited range. The farther away a receiver/responding node is in hops from the requesting node, the smaller the intersection is between the requesting node and the receiver/responding node, and the larger the expanded view of the P2P is likely to therefore be. Thus, unlike conventional P2P expansion methods that tend to result in a sometimes exponential increase in network traffic (e.g., by increasing either a search request message's time to live or a node's number of peer connections), the method 200 actually conserves traffic while at the same time "expanding" the network. In addition, response latency is typically reduced as a requesting node can select faster nodes which can provide more data than nodes on slower links.

Those skilled in the art will appreciate that a node may periodically update its referral message, for example based on one or more test searches. For example, a node may send a test search message to one or more nodes identified in its referral message, in order to determine that the nodes identified in the referral message still have the indicated data. If a node identified in the referral message no longer has the indicated data, it can be removed from the referral message. Test searches may be performed periodically, e.g., based on an expiration of a predefined period of time. In yet another embodiment, a node may remove a referred node from the referral message if the node receives a message from a requesting node (to which the referred node has been referred) indicating that the referred node no longer has the indicated data.

Moreover, by referring nodes that have or are likely to have the requested data, the method 200 facilitates the building of "communities" within the P2P by identifying out-of-range nodes with potentially similar interests (e.g., as inferred by the request for the same data). The existence of communities allows nodes with similar interests to directly communicate and exchange data, thereby reducing overall network traffic (as search request messages sent through the community tend not to propagate as far into the P2P network as is typical with a normal search as described in connection with FIG. 1).

Figure 3:
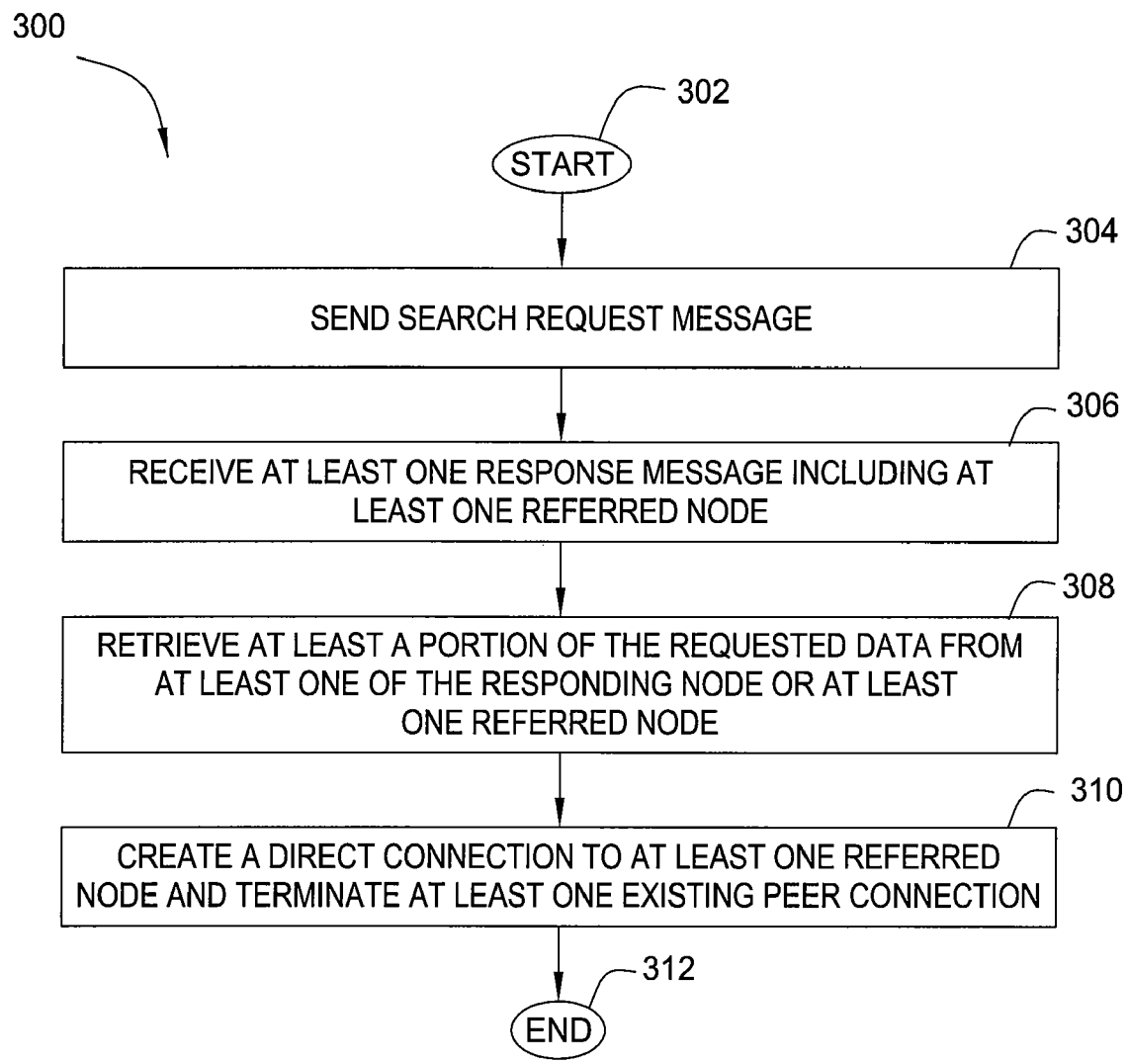
FIG. 3 is a flow diagram illustrating one embodiment of a method for building communities in a P2P network, such as the network illustrated in FIG. 1.

FIG. 3 is a flow diagram illustrating one embodiment of a method 300 for building communities in a P2P network, such as the network 100 illustrated in FIG. 1. The method 300 may be implemented at, for example, any node (e.g., 101, 103, 111 or 113) on the P2P network 100. The method 300 is initialized at step 302 and proceeds to step 304, where the method 300 sends a search request message, e.g., to one or more peer nodes.

In step 306, the method 300 receives at least one response message responsive to the search request message sent in step 304. The response message includes at least one referred node, e.g., as described with reference to the method 200. In one embodiment, the response message may also include an indication that the responding node has the requested data, e.g., in accordance with traditional P2P protocols. The method 300 may collate multiple response messages received from multiple responding nodes to create an aggregate list of potential sources for the requested data.

Once the method 300 has received the response message, the method 300 proceeds to step 308 and retrieves at least a portion of the requested data from at least one of the responding node and/or at least one referred node listed in the referral message. In one embodiment, the method 300 may choose which portions of the requested data to retrieve from which responding and/or referred nodes, based on a collated list of potential sources for the requested data. In another embodiment, the requesting node may identify one or more preferred nodes for searching, based on the information received in step 306.

In step 310, the method 300 creates a direct peer connection to at least one of the referred nodes, e.g., to admit the referred node into or to create a "community" or subset of nodes in the P2P network that share common interests and/or data. In one embodiment, the referred node is a mutually preferred node (e.g., preferred for searching). In one embodiment, step 310 further includes terminating an existing peer connection for every new peer connection that is created (e.g., to conserve network resources where each node in the P2P network is allowed a maximum number of peer connections). Thus, for example, referring back to FIG. 1, the method 300 may create a direct peer connection between the requesting node 101 and the normally out-of-range node 113, which has the requested data, and may terminate the peer connection between the requesting node 101 and the intermediate node 111 illustrated to the left of the requesting node 101.

The method 300 is terminated in step 312.

Figure 4:
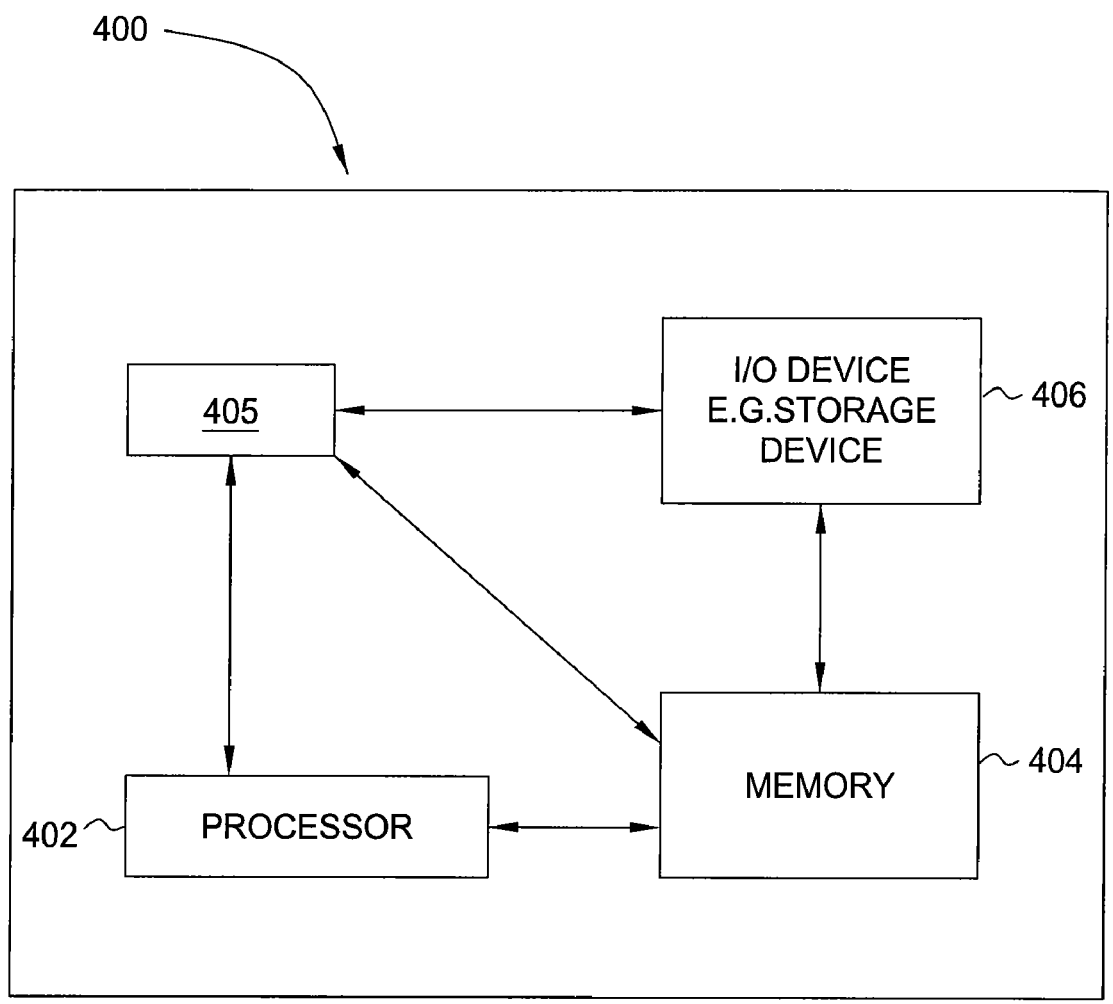
FIG. 4 is a high level block diagram of the network expansion method that is implemented using a general purpose computing device.

FIG. 4 is a high level block diagram of the network expansion method that is implemented using a general purpose computing device 400. In one embodiment, a general purpose computing device 400 comprises a processor 402, a memory 404, a data transfer module 405 and various input/output (I/O) devices 406 such as a display, a keyboard, a mouse, a modem, and the like. In one embodiment, at least one I/O device is a storage device (e.g., a disk drive, an optical disk drive, a floppy disk drive). It should be understood that the data transfer module 405 can be implemented as a physical device or subsystem that is coupled to a processor through a communication channel.

Alternatively, the data transfer module 405 can be represented by one or more software applications (or even a combination of software and hardware, e.g., using Application Specific Integrated Circuits (ASIC)), where the software is loaded from a storage medium (e.g., I/O devices 406) and operated by the processor 402 in the memory 404 of the general purpose computing device 400. Thus, in one embodiment, the data transfer module 405 for expanding a P2P network and building P2P communities described herein with reference to the preceding Figures can be stored on a computer readable medium or carrier (e.g., RAM, magnetic or optical drive or diskette, and the like).

Thus, the present invention represents a significant advancement in the field of data transfer networks. A method and apparatus are provided that make it possible for a requesting node on a P2P network to receive data from nodes that would normally be outside of the requesting node's "range" by enabling the referral, by intermediate nodes, of the out-of-range nodes. This capability further facilitates the building of "communities" within the P2P network, enabling faster, more efficient data transfers and reducing network traffic.

While foregoing is directed to the preferred embodiment of the present invention, other and further embodiments of the invention may be devised without departing from the basic scope thereof, and the scope thereof is determined by the claims that follow.

The invention claimed is:

1. A method for transferring data between nodes in a network, said method comprising:
    receiving, by a hardware processor of a first node, a search request message from a second node, said search request message requesting data;
    determining, by said first node, that a threshold amount of a time to live field associated with said search request message has expired;
    sending, by said first node in response to said determining, a response message to said second node, said response message including a referral message identifying at least one third node that is expected to have said data; and
    updating said referral message to remove said at least one third node when said at least one third node no longer has said data;
    wherein said updating further comprises: sending, by said first node, a test search message to said at least one third node, to determine whether said at least one third node still has said data.

2. The method of claim 1, wherein the threshold amount of the time to live field is all of the time to live field.

3. The method of claim 1, wherein the threshold amount of the time to live field is half of the time to live field.

4. The method of claim 1, wherein the first node sends the referral message only when the first node does not have the data.

5. The method of claim 1, wherein the at least one third node is out of a range of the search request message based on the time to live field.

6. The method of claim 1, wherein said response message further indicates that said first node has said data.

7. The method of claim 1, wherein said at least one third node is a node that has retrieved said data from said first node.

8. The method of claim 1, wherein said referral message includes at least one of: a hostname of said at least one third node, an Internet Protocol address of said at least one third node, or a virtual name of said at least one third node.

9. The method of claim 1, wherein said at least one third node has retrieved said data within a predefined maximum timeframe.

10. The method of claim 9, where said predefined maximum timeframe is defined by at least one of: said first node or said second node.

11. The method of claim 1, wherein said updating further comprises:
    receiving, from said second node, a message indicating that said at least one third node no longer has said data.

12. The method of claim 1, wherein said referral message is ranked based on at least one of: an uptime of said at least one third node, a bandwidth of said at least one third node, or and a latency of said at least one third node.

13. A computer readable storage device containing an executable program for transferring data between nodes in a network, the program performs steps of:
    receiving, by a first node, a search request message from a second node, said search request message requesting data;
    determining, by said first node, that a threshold amount of a time to live field associated with said search request message has expired;
    sending, by said first node in response to said determining, a response message to said second node, said response message including a referral message identifying at least one third node that is expected to have said data; and updating said referral message to remove said at least one third node when said at least one third node no longer has said data;

wherein said updating further comprises: sending, by said first node, a test search message to said at least one third node, to determine whether said at least one third node still has said data.

14. The computer readable storage device of claim 13, wherein said response message further indicates that said first node has said data.

15. The computer readable storage device of claim 13, wherein said at least one third node is a node that has retrieved said data from said first node.

16. The computer readable storage device of claim 13, wherein said referral message includes at least one of: a hostname of said at least one third node, an Internet Protocol address of said at least one third node, or a virtual name of said at least one third node.

17. The computer readable storage device of claim 13, wherein said at least one third node has retrieved said data within a predefined maximum timeframe.

18. The computer readable storage device of claim 17, where said predefined maximum timeframe is defined by at least one of: said first node or said second node.

19. The computer readable storage device of claim 1, wherein said updating further comprises:

receiving, from said second node, a message indicating that said at least one third node no longer has said data.

20. The computer readable storage device of claim 13, wherein said referral message is ranked based on at least one of: an uptime of said at least one third node, a bandwidth of said at least one third node, or a latency of said at least one third node.

21. Apparatus comprising:
means for receiving, by a first node, a search request message from a second node, said search request message requesting data;
means for determining, by said first node, that a threshold amount of a time to live field associated with said search request message has expired;
means for sending, by said first node responsive to said means for determining, a response message to said second node, said response message including a referral message identifying at least one third node that is expected to have said data; and
means for updating said referral message to remove said at least one third node when said at least one third node no longer has said data;
means for sending, by said first node, a test search message to said at least one third node, to determine whether said at least one third node still has said data.

22. A method for building a community of nodes having common interests in a network, said method comprising the steps of:
sending, by a hardware processor of a first node, a search request message, said search request message requesting data, said search request message specifying a threshold amount of a time to live field associated with said search request message, wherein said search request message further requests a referral message when the threshold amount of the time to live field has expired;
receiving a response message from a second node, said response message including the referral message identifying at least one third node that is expected to have said data; and
updating said referral message to remove said at least one third node when said at least one third node no longer has said data;
wherein said updating further comprises: sending, by said first node, a test search message to said at least one third node, to determine whether said at least one third node still has said data.

23. The method of claim 22, further comprising:
admitting at least one of said at least one third node into said community.

24. The method of claim 23, wherein said admitting comprises:
creating a new direct peer connection from a node in said community to said at least one of said at least one third node.

25. A computer readable storage device containing an executable program for building a community of nodes having common interests in a network, the program performs steps of:
sending, by a first node, a search request message, said search request message requesting data, said search request message specifying a threshold amount of a time to live field associated with said search request message, wherein said search request message further requests a referral message when the threshold amount of the time to live field has expired;
receiving a response message from a second node, said response message including the referral message identifying at least one third node that is expected to have said data; and
updating said referral message to remove said at least one third node when said at least one third node no longer has said data;
wherein said updating further comprises: sending, by said first node, a test search message to said at least one third node, to determine whether said at least one third node still has said data.

26. Apparatus comprising:
means for sending, by a first node, a search request message, said search request message requesting data, said search request message specifying a threshold amount of a time to live field associated with said search request message, wherein said search request message further requests a referral message when the threshold amount of the time to live field has expired;
means for receiving a response message from a second node, said response message including a referral message identifying at least one third node that is expected to have said data; and
means for updating said referral message to remove said at least one third node when said at least one third node no longer has said data;
means for sending, by said first node, a test search message to said at least one third node, to determine whether said at least one third node still has said data.

* * * * *